United States Patent
Maier et al.

(10) Patent No.: US 10,576,577 B2
(45) Date of Patent: Mar. 3, 2020

(54) NOBLE-METAL POWDER AND THE USE THEREOF FOR PRODUCING COMPONENTS

(71) Applicant: HARAEUS DEUTSCHLAND GMBH & CO. KG, Hanau (DE)

(72) Inventors: Dirk Maier, Offenbach (DE); Stephen Humm, Steinau (DE)

(73) Assignee: HARAEUS DEUTSCHLAND GMBH & CO. KG, Hanau (DE)

( * ) Notice: Subject to any disclaimer, the term of this patent is extended or adjusted under 35 U.S.C. 154(b) by 320 days.

(21) Appl. No.: 15/449,081

(22) Filed: Mar. 3, 2017

(65) Prior Publication Data

US 2017/0252854 A1 Sep. 7, 2017

(30) Foreign Application Priority Data

Mar. 7, 2016 (EP) .................... 16158882

(51) Int. Cl.
*B23K 15/00* (2006.01)
*B22F 1/00* (2006.01)
*B33Y 70/00* (2015.01)
*B23K 26/342* (2014.01)
*B33Y 10/00* (2015.01)
*B33Y 80/00* (2015.01)
*B22F 3/105* (2006.01)
*C22C 1/04* (2006.01)

(52) U.S. Cl.
CPC ........ *B23K 15/0086* (2013.01); *B22F 1/0014* (2013.01); *B22F 1/0048* (2013.01); *B22F 3/1055* (2013.01); *B23K 26/342* (2015.10); *B33Y 70/00* (2014.12); *B33Y 10/00* (2014.12); *B33Y 80/00* (2014.12); *C22C 1/0466* (2013.01); *Y02P 10/295* (2015.11)

(58) Field of Classification Search
CPC . B22F 3/1055; B23K 15/0086; B23K 26/342; B21F 1/0048; B21F 1/0014; B33Y 70/00
See application file for complete search history.

(56) References Cited

U.S. PATENT DOCUMENTS

| 7,740,683 B2 | 6/2010 | Thorsson et al. | |
| 2014/0126155 A1* | 5/2014 | Imamura | B23K 35/3006 361/715 |
| 2017/0226612 A1* | 8/2017 | Wagawa | B01J 37/04 |

FOREIGN PATENT DOCUMENTS

| CN | 103619779 A | 3/2014 |
| CN | 104325136 A | 2/2015 |
| CN | 108247072 A | 7/2018 |
| JP | 7-174848 A | 7/1995 |
| JP | H10-81901 A | 3/1998 |
| JP | 2009-270130 A | 11/2009 |
| JP | 2009270130 A * | 11/2009 |
| JP | 2010-209412 A | 9/2010 |
| JP | 2014-173107 A | 9/2014 |
| JP | 5703414 B1 | 2/2015 |
| JP | 2015-218368 A | 12/2015 |
| WO | 2013/128416 A2 | 9/2013 |

OTHER PUBLICATIONS

English abstract of JP 2009-270130 A, previously submitted on May 24, 2017.
A. Simchi, "The Role of Particle Size on the Laser Sintering of Iron Powder", Oct. 10, 2004, pp. 937-948, XP001214017.
European Search Report for Application No. 16158882.7-1373, dated Sep. 20, 2016.
Chinese office action for Patent Application No. 201710123940.3, dated Aug. 1, 2018.
Office action for Korean Patent Application No. 10-2017-0027690, dated Dec. 20, 2017.
Japanese Office action for Patent Application No. 2017-040057.
TOCOM, Transaction Summary [Palladium]—Transaction Summary.
TOCOM, Transaction Summary [Platinum (Standard Transaction / Mini Transaction)]—Transaction Summary.
"Grade classification and certification symbols for precious metal products", Japan Mint 1999-2019.
Opposition for Japanese Patent Application No. 6456992.
Liu, et al., "Investigation the effect of particle size distribution on processing parameters optimisation in selective laser melting process", solid Freedom Fabrication Proceedings, Aug. 2011.
Dawes, et al., "Introduction to the Addictive Manufacturing Powder Metallurgy Supply Chain", Johnson Matthey Technol, Rev, 2015, 59, (3). 243-256.
Wermuth, et al., "Characterization of platinum alloy powder—PtRh 80-20—for additive layer manufacturing", 6th European Conference for Aeronautics and Space Sciences, 2015.
Shimizu, et al., "Recent Advence of Metal Addictive Manufacturing", Journal of the Japan Society for Precision Engineering vol. 80. No. 12. 2014.
Spierings, et al., "Powder flowability characterisation methodology for powder-bed-based metal additive manufacturing", Prog. Addit Manuf. 2016, 1:9-20.
Zito, et al., "Definition and solidity of gold and platinum jewelry produced using selective laser melting (SLM) Technology", May 2015.
Notice of Reasons for Revocation for Japanese Patent Application No. 6456992, dated Oct. 24, 2019.
Interrogation for Japanese Patent Application No. 6456992, dated Oct. 24, 2019.
Machine Translation for foreign reference No. JP-2015-218368 A, previously submitted on Oct. 25, 2019.

* cited by examiner

Primary Examiner — Ibrahime A Abraham
Assistant Examiner — John J Norton
(74) Attorney, Agent, or Firm — Tarolli, Sundheim, Covell & Tummino LLP

(57) ABSTRACT

The present invention relates to a powder composed of spherical noble-metal particles having a particle size distribution with a $d_{10}$ value of $\geq 10.0$ μm and a $d_{90}$ value of $\leq 80.0$ μm.

12 Claims, No Drawings

NOBLE-METAL POWDER AND THE USE THEREOF FOR PRODUCING COMPONENTS

Owing to their properties, noble metals such as gold, silver and the platinum-group metals are attractive materials for the production of components which are exposed to high chemical (especially corrosive), thermal or mechanical stresses during their use.

Components composed of noble metal are, for example, used in the area of medical technology, for spark plugs or nozzles (e.g. combustion nozzles or spinnerets) or else in the area of jewellery production. Owing to their high density, the platinum-group metals such as, for example, iridium or alloys composed of platinum and iridium are suitable materials for the production of oscillating weights, for example for timepieces (i.e. balance wheel).

Metallic components are frequently produced via semi-finished metal products, which are then additionally subjected to a suitable further treatment. In the case of components having a complex or delicate structure, the further processing of the semi-finished product usually includes a machining process. However, in the case of brittle materials such as, for example, iridium or the alloys thereof with other platinum-group metals, this is either not possible at all, or if it is possible, then only with a high input of time and material.

In the case of materials of very high melting point, especially iridium, ruthenium, osmium or the alloys thereof, the production of components via semi-finished products is not possible or only possible to a limited extent, since there are no suitable moulds available for the accommodation of the melt owing to the high melting point.

By means of additive manufacturing processes, it is possible to directly produce components having a complex three-dimensional geometry. Additive manufacturing refers to a process in which a component is constructed in a layer-by-layer manner by the deposition of material on the basis of digital 3D design data. Usually, this involves first applying a thin layer of the powder material to the construction platform. Via a sufficiently high energy input, for example in the form of a laser beam or electron beam, the powder is at least partially melted at the sites specified by the computer-generated design data. Thereafter, the construction platform is lowered and a further application of powder takes place. The further powder layer is again at least partially melted and joins to the underlying layer at the defined sites. These steps are repeated until the component is present in its final shape.

In order to apply a powder in the form of a layer to the construction platform as quickly and efficiently as possible, said powder should have a highest possible flowability. On the other hand, the quality of the application of powder and the bulk density of the powder layer should be as high as possible. In addition, the component obtained after the additive manufacturing process should have a lowest possible porosity. Further relevant properties of the finished component are, for example, a high edge sharpness and a lowest possible surface roughness. However, in practice, it is found that a simultaneous optimization of said properties is very difficult. In many cases, an improvement of a particular property (e.g. flowability) is achieved at the expense of one of the other properties (such as, for example, quality of the application of powder or density in the finished component).

Especially for platinum-group metals of very high melting point, it continues to remain a huge challenge to provide powders which are not only flowable, but can also be processed to give a component of high relative density in an additive manufacturing process under the action of a high-energy radiation.

WO 2013/128416 describes the use of a silver alloy containing germanium, aluminium, silicon and/or boron as alloy elements for additive manufacturing processes.

It is an object of the present invention to provide a noble-metal powder which makes it possible to efficiently produce noble-metal components of high-density (i.e. low porosity) via additive manufacturing processes. In addition, the components obtainable from the noble-metal powder should have high edge sharpness and/or low surface roughness.

The object is achieved by a powder composed of spherical noble-metal particles having a particle size distribution with a $d_{10}$ value of $\geq 10.0$ μm and a $d_{90}$ value of $\leq 80.0$ μm.

Within the scope of the present invention, it was established that a noble-metal powder composed of spherical particles, the size distribution of which satisfies the criteria according to the invention with respect to the $d_{10}$ and $d_{90}$ values, has a high flowability and, moreover within the scope of an additive manufacturing process, allows a high-quality application of powder and the production of complex 3D components of high density (i.e. of low porosity).

As will be described below in more detail, the spherical noble-metal particles can be produced via atomization processes. In order to obtain a particle size distribution having the above-defined $d_{10}$ and $d_{90}$ values, the noble-metal particles obtained via atomization can subsequently be subjected to a classification process such as, for example, sieving, air classification or centrifugation.

Within the scope of the present invention, the particle size distribution in the form of a mass distribution cumulative curve is determined by laser diffraction.

Preferably, the noble metal is a platinum-group metal, gold or silver or an alloy composed of at least two of the aforementioned noble metals. Preferred platinum-group metals are platinum, iridium, palladium, ruthenium, rhodium or osmium or an alloy composed of at least two of said platinum-group metals (e.g. platinum-iridium or platinum-rhodium alloys).

Preferably, the noble-metal particles contain elements which are not noble metals, in particular not platinum-group metal, gold or silver, in a total amount of not more than 0.1% by weight, more preferably not more than 0.01% by weight. Therefore, the noble-metal particles consist of the noble metal preferably to an extent of at least 99.9% by weight, more preferably at least 99.99% by weight. As already mentioned above, the term "noble metal" also includes an alloy composed of two or more noble metals.

Preferably, the noble-metal particles consist of a noble metal and unavoidable impurities.

Within the scope of the present invention, it is possible for the noble-metal particles to contain only one noble metal (preferably iridium, platinum, palladium, ruthenium, rhodium, osmium, gold or silver). Alternatively, it is also possible for the noble-metal particles to contain two or more noble metals, preferably in the form of an alloy. Suitable alloys are, for example, alloys composed of at least two platinum-group metals such as, for example, Pt—Rh or Pt—Ir alloys. The platinum content of said alloys can vary over a broad range and is, for example, within the range from 95% by weight to 20% by weight. In this connection, a platinum-rhodium alloy having a rhodium content of 20% by weight ("PtRh20") and platinum-iridium alloys having an iridium content of 10% by weight ("PtIr10"), 20% by weight ("PtIr20"), 30% by weight ("PtIr30") or 50% by weight ("PtIr50") can be mentioned as exemplary alloys.

Preferably, the powder according to the invention contains the noble-metal particles in a proportion of at least 90% by weight, more preferably at least 95% by weight or even at least 99% by weight, based on the total weight of the powder. In a preferred embodiment, the powder consists of the noble-metal particles.

As already explained above, the noble-metal particles of the powder according to the invention have a particle size distribution with a $d_{10}$ value of ≥10.0 µm and a $d_{90}$ value of ≤80.0 µm.

In a preferred embodiment, the $d_{10}$ value is ≥11.0 µm, more preferably ≥15.0 µm, even more preferably ≥20.0 µm, and the $d_{90}$ value is ≤70.0 µm.

Preferably, the difference between the $d_{90}$ value and the $d_{10}$ value (i.e. $d_{90}-d_{10}$) is at least 15 µm, more preferably at least 20 µm.

Preferably, the $d_{10}$ value is within the range from 10.0 to 35.0 µm, more preferably 11.0 to 32.0 µm, and/or the $d_{90}$ value is within the range from 40.0 to 80.0 µm, more preferably 43.0 to 70.0 µm.

In a preferred embodiment, the noble-metal particles consist of iridium and unavoidable impurities (the proportion of which is preferably not more than 0.1% by weight, more preferably not more than 0.01% by weight, based on the total weight of the noble-metal particles), the $d_{10}$ value is within the range from 20.0 to 30.0 µm, the $d_{90}$ value is within the range from 40.0 to 80.0 µm, more preferably 43.0 to 70.0 µm, the difference between the $d_{90}$ value and the $d_{10}$ value being preferably at least 20 µm, more preferably 20-40 µm.

Preferably, the powder satisfies the following condition:

$$F/\rho_{TH} \leq 0.30 \text{ s}/(50 \text{ cm}^3)$$

where
F is the flowability of the powder in s/(50 g), determined in accordance with DIN EN ISO 4490:2014-11, and
$\rho_{TH}$ is the theoretical density (in g/cm$^3$) of the noble metal forming the noble-metal particles.

More preferably, $F/\rho_{TH} \leq 0.25$ s/(50 cm$^3$), and even more preferably $F/\rho_{TH} \leq 0.20$ s/(50 cm$^3$).

As a measure of the sphericity of a particle, the ratio of its minimum diameter $d_{min}$ to its maximum diameter $d_{max}$ can be considered in a first approximation. The closer this value is to 1.0, the higher the sphericity of the particle.

Based on the number of noble-metal particles, preferably at least 80%, even more preferably at least 90%, of the noble-metal particles satisfy the following condition:

$$0.8 \leq d_{min}/d_{max} \leq 1.0;$$

where $d_{min}$ and $d_{max}$ are the minimum diameter and the maximum diameter, respectively, of a noble-metal particle.

Suitable methods for the production of metal particles of most spherical possible shape are fundamentally known to a person skilled in the art. Preferably, the production of the powder composed of noble-metal particles is achieved by an atomization process, especially a gas atomization (e.g. using nitrogen or a noble gas such as argon or helium as atomization gas), a plasma atomization, a centrifugal atomization or a crucible-free atomization (e.g. a process referred to as rotating electrode process (REP), in particular a plasma rotating electrode process (PREP)). A further exemplary process is the EIGA process (electrode induction melting gas atomization), induction melting of the starting material and subsequently gas atomization.

In the case of gas atomization, the starting material is melted under an air or protective-gas blanket or under vacuum. The chamber is then filled with gas in order to drive the molten metal through the nozzle, where an atomization gas (e.g. nitrogen or a noble gas such as helium or argon) strikes the flowing melt at high speed and breaks it up. The result is spherical metal drops, which then solidify to give spherical metal particles.

In the case of plasma atomization, the starting material is fed to a plasma torch, which atomizes the powder with the aid of a gas.

In the case of centrifugal atomization, melt drops are spun away from a rotating source and solidify to give spherical metal particles.

In the case of crucible-free atomization with use of a rotating electrode (REP), a metal rod rotates at a high speed of revolution and, in the course of this, its free end is gradually melted, for example by an electron beam, an electric arc or a plasma. Melt drops are spun away from the rotating metal rod and solidify to give spherical metal particles. In this connection, the metal rod can rotate either around a horizontal axis or around a vertical axis. Since contact with a crucible material is avoided in the REP process, the proportion of undesired metallic or nonmetallic inclusions in the powder and in the components produced therefrom can be kept very low.

Preferably, the atomization is done with an inert gas (e.g. nitrogen or a noble gas such as argon).

Preferably, the atomization is done with exclusion of oxygen or at least in the presence of very low amounts of oxygen. Therefore, it is preferred that less than 5 ppm (vol) of oxygen are present in the gas volume during atomization.

In order to obtain a size distribution having the above-described $d_{10}$ and $d_{90}$ values for the noble-metal particles obtained by atomization, said particles are preferably subjected to a classification process. Preferred classification processes are sieving, air classification and centrifugation. It is also possible to connect two or more of said classification processes one after another in order to set the particle size distribution as accurately as possible. For example, it is possible to first carry out one or more sieving processes and then one or more air classification processes.

Preferably, the mean crystallite size in the noble-metal particles is ≥200 nm, more preferably ≥250 nm. With said crystallite size, it is possible to achieve a further optimization of flowability, of quality of the application of powder, and of porosity of the noble-metal component obtained via additive manufacturing. In a preferred embodiment, the mean crystallite size of the noble-metal particles is within the range of 200-400 nm, more preferably 250-360 nm.

If necessary, more accurate setting of a suitable crystallite size can be optionally achieved by a thermal treatment (e.g. tempering).

The mean crystallite size can be determined via the Scherrer equation on the basis of an X-ray powder diffraction diffractogram. This is known to a person skilled in the art.

The present invention further provides for the use of the powder according to the invention in an additive manufacturing process. Using the above-described powder, it is possible to produce components of very high relative density (i.e. very low porosity) in an additive manufacturing process.

As already explained above, the term "additive manufacturing" refers to a process in which a component is constructed in a layer-by-layer manner by the deposition of material on the basis of digital 3D design data.

Suitable additive production processes are fundamentally known to a person skilled in the art. Selective laser sintering (SLS), selective laser melting (SLM), selective electron-beam melting, thermal spraying, gas dynamic cold spray can be mentioned by way of example. It is also possible to combine an additive manufacturing process with a machining process in one hybrid device.

The present invention further provides a component which is obtainable from the above-described powder via an additive manufacturing process and which has a porosity of less than 10%, preferably less than 5%.

Through use of the above-described noble-metal powder, components virtually completely consisting of a noble metal can be produced even in complex or delicate structures.

With respect to the preferred noble metals, reference can be made to the above statements in the description of the powder according to the invention.

The component can, for example, consist of the noble metal to an extent of at least 99.9% by weight, more preferably at least 99.99% by weight, i.e. the proportion of elements which are not noble metals, in particular not platinum-group metal, gold or silver, is preferably not more than 0.1% by weight, more preferably not more than 0.01% by weight.

The component according to the invention can, for example, be a component of a spark plug (especially the electrode of a spark plug), a nozzle (e.g. a nozzle in a combustion chamber), part of a piece of jewellery or be an oscillating weight (e.g. in a timepiece).

The present invention further provides an additive manufacturing process for producing a component, comprising the following steps:
(a) applying the above-described powder in the form of a first layer to a substrate in a construction space,
(b) at least partially melting the powder of the first layer using high-energy radiation and allowing solidification of the melted powder,
(c) applying a further layer of the powder to the first layer,
(d) at least partially melting the powder of the further layer using high-energy radiation and allowing solidification of the melted powder,
(e) repeating steps (c) and (d).

Customarily, the construction space is evacuated or filled with an inert gas (e.g. nitrogen or a noble gas) prior to step (a).

The high-energy radiation can, for example, be laser beams or electron beams.

At the end of the process, free or loose powder can be removed from the component.

Optionally, the component can be subjected to a follow-up compression after the additive process. An optional follow-up processing of the component (e.g. by polishing, sanding, etching, drilling, milling or coating) is possible too.

The following examples will be used to describe the invention in more detail.

EXAMPLES

A) Methods of Measurement

The parameters used in the present invention were determined in accordance with the following methods of measurement.

Particle Size Distribution and the $d_{10}$ and $d_{90}$ Values Thereof

Particle size distribution was determined by laser diffraction using the instrument "Sympatec Helos BR/R3". Measurement range: 0.9-175 and 4.5-875.

The dispersion system used for dispersing the powder particles:

RODOD/M dry dispersion system with VIBRI vibratory feeder (with Venturi nozzle). Sample amount: approximately 5 g.

Wavelength of the laser radiation: 632.8 nm.

Evaluation done via Mie theory.

The particle sizes are obtained as a mass distribution, i.e. within the scope of the present invention, what is determined is the particle size distribution in the form of a mass distribution cumulative curve.

The $d_{10}$ and $d_{90}$ values can be read off from the particle size distribution measured by laser diffraction (mass distribution).

Flowability of the Powder

Determined in accordance with DIN EN ISO 4490 by means of a Hall flowmeter from Impact Innovations.

The values for the theoretical density of the noble metals (for normalizing flowability to density) can be taken from relevant standard works. For example, the theoretical density of iridium is 22.56 g/cm$^3$, that of gold is 19.32 g/cm$^3$, that of silver is 10.49 g/cm$^3$, that of PtRh20 is 18.71 g/cm$^3$, and that of PtIr50 is 22.05 g/cm$^3$.

$d_{min}$ and $d_{max}$ of the Noble-Metal Particles

Minimum ($d_{min}$) and maximum diameter ($d_{max}$) of the particles were determined by optical image analysis as follows:

Following ISO 9276-1, ISO 9276-6 and ISO13320, the morphology and shape of the particles was determined using a QICPIC image analysis system (Sympatec GmbH System-Partikel-Technik Germany). The dry feeding of the particles was carried out using compressed air and the QICPIC-connected RODOS/L (0.50 63.0 mm) unit.

The measurement area was set to M6, covering particles having a diameter from 5 to 170 µm. Additional parameters were: image frequency=450 Hz, VIBRI feed rate=20%, funnel height=2 mm, inner diameter of the dispersion pipe=4 mm, pressure: 1 bar. FERET_MIN (minimum diameter $d_{min}$) and FERET_MAX (maximum diameter $d_{max}$) were determined. As a measure of the sphericity of a particle, the ratio of the minimum diameter $d_{min}$ to the maximum diameter $d_{max}$ was used in a first approximation.

Mean Crystallite Size

X-ray powder diffraction diffractograms were measured using a STADI P two-circle diffractometer from Stoe & Cie in transmission. The measurement was done using Cu K$_{\alpha1}$ radiation. For the calibration, the NIST standard Si (640 d) was used. The 2-theta position of a reflection was determined on the basis of its peak maximum.

The diffraction reflections of the X-ray powder diffraction diffractogram were mathematically fitted using Stoe pattern-fitting software and the full widths at half maximum (FWHM) of the diffraction reflections were determined.

The measured values were corrected with respect to the instrument standard LaB6 NIST (660 b).

The mean crystallite size was determined using the Stoe software. To this end, the Scherrer equation was applied to the (111) reflection. As is known to a person skilled in the art, the Scherrer equation is as follows:

$$d = (K * \lambda)/(\beta * \cos \theta)$$

where d is the mean crystallite size,

K is a dimensionless shape factor,

λ is the wavelength of the X-radiation,

β is the full width at half maximum of the reflection, measured in radians,

θ is the diffraction angle.

A value of 1.0 was taken for K.

Porosity

Porosity is the result of the following equation:

$$\text{Porosity } P \text{ (in \%)} = (1 - (\rho_{geo}/\rho_{th})) \times 100\%$$

where $\rho_{geo}$ is the geometric density of the component and $\rho_{th}$ is the theoretical density of the component.

Geometric density can be ascertained according to Archimedes' principle, for example using a hydrostatic balance. The theoretical density of the component corresponds to the theoretical density of the noble metal from which the component is formed.

$$\text{Relative density } D_{rel} \text{ (in \%) is the result of } (\rho_{geo}/\rho_{th}) \times 100\%. \text{ Thus: } P = 1 - D_{rel}$$

Composition of the Noble-Metal Particles

Determined by inductively coupled plasma optical emission spectrometry (ICP-OES).

B) Production of Powders Composed of Spherical Noble-Metal Particles and the Use Thereof for the Production of Noble-Metal Components by Additive Manufacturing Using various noble metals, noble-metal powders were produced via an atomization process. Ir powder, PtRh20 powder, PtIr50 powder, Ag powder and Au powder were produced.

Both in the examples according to the invention and in the comparative examples, the powders were produced in each case by induction melting of the starting material and gas atomization (EIGA (electrode induction melting gas atomization)) using argon. This process yields spherical powder particles.

Thereafter, the powders obtained via the atomization process were classified by sieving. Sieving was done using the instrument Retsch AS 200. Sieves of 20 μm, 45 μm, 63 μm and 140 μm mesh size were used and sieving was carried out for 2-5 minutes using an amount of approximately 100 g at different amplitudes.

The $d_{10}$ and $d_{90}$ values of the classified powders were determined. In addition, flowability, crystallite size and crystallinity of the powders were measured.

From these powders, a component was produced in each case in an additive manufacturing process. The same process parameters were always used. The component was produced by selective laser melting (SLM). Machine: machine from ConceptLaser, model MLab.

The quality of the application of powder (i.e. of the powder layers introduced into the construction space) was assessed on the basis of the number of visually identifiable imperfections (e.g. mark due to coarse particles or clumps) per 30 application operations on an area of 50 cm$^2$.

Geometric density and relative density (i.e. quotient from geometric density and theoretical density) were determined for the components obtained.

The results for the powders consisting of iridium particles and for the iridium components produced therefrom are combined in table 1.

TABLE 1

Properties of the iridium powders and of the components produced therefrom

| | Ex. 1 | Ex. 2 | Ex. 3 | Ex. 4 | Comp. ex. 1 | Comp. ex. 2 | Comp. ex. 3 |
|---|---|---|---|---|---|---|---|
| $d_{10}$ [μm] | 22.46 | 28.34 | 11.8 | 12.4 | 136.96 | 9.3 | 4.2 |
| $d_{90}$ [μm] | 48.15 | 67.25 | 47.5 | 67.5 | 292.79 | 46.9 | 68.6 |
| Flowability (s/50 g) | 3.5 | 3.1 | 3.8 | 4.1 | 6.9 | Not measurable* | 6.9 |
| Flowability | Very good | Very good | Good | Good | Moderate | Poor | Moderate |
| Flowability, [s/cm$^3$] normalized to density | 0.16 | 0.14 | 0.17 | 0.18 | 0.31 | | 0.31 |
| Crystallite size [nm] | 306 | 320 | 291 | 310 | 171 | 191 | 160 |
| Quality of application of powder | 0-1 | 0-1 | 1-2 | 1-2 | 2-4 | 4-10 | 2-4 |
| Density after additive manufacturing [g/cm$^3$] | 21.91 | 21.89 | 21.84 | 21.83 | 20.82 | 19.8 | 20.82 |
| Density after additive manufacturing [%] | 97.12 | 97.03 | 96.81 | 96.76 | 92.29 | 87.77 | 92.29 |

*Powder got stuck in the funnel.

Examples 1-4 and comp. ex. 1-3: powder particles consist of iridium

Example 5 and comp. ex. 4: powder particles consist of PtRh20 alloy

Example 6 and comp. ex. 5: powder particles consist of PtIr50 alloy

Example 7 and comp. ex. 6: powder particles consist of silver

Example 8 and comp. ex. 7: powder particles consist of gold

Quality of the application of powder: number of visually identifiable imperfections (e.g. mark due to coarse particles or clumps) per 30 application operations on an area of 50 cm$^2$ assessed, i.e. the lower the value, the better the quality of the application of powder As demonstrated by the results in table 1, only the iridium powders with $d_{10}$ value ≥10.0 and $d_{90}$ value ≤80.0 allow the realization of a high flowability with high quality of application of powder at the same time and the production of a component of low porosity (i.e. high relative density) via an additive manufacturing process.

As shown in particular by example 3 ($d_{10}$ value: 11.8 μm; $d_{90}$ value: 47.5 μm) and comparative example 2 ($d_{10}$ value:

9.3 µm; $d_{90}$ value: 46.9 µm), a $d_{10}$ value of less than 10 µm leads abruptly to a significant deterioration both in flowability and in the quality of the applied powder layer.

The results for the PtRh20 powders and for the PtRh20 components produced therefrom are combined in table 2.

TABLE 2

Properties of the PtRh20 powders and of the components produced therefrom

| | Ex. 5 | Comp. ex. 4 |
|---|---|---|
| $d_{10}$ [µm] | 12.3 | 148.5 |
| $d_{90}$ [µm] | 65.7 | 307.5 |
| Flowability [s/50 g] | 4.5 | 6.5 |
| Flowability | Good | Moderate |
| Flowability, [s/cm³] normalized to density | 0.24 | 0.35 |
| Quality of application of powder | 0-1 | 2-4 |
| Density after additive manufacturing [g/cm³] | 18.5 | 17.6 |
| Density after additive manufacturing [%] | 98.88 | 94.07 |

The results for the PtIr50 powders and for the PtIr50 components produced therefrom are combined in table 3.

TABLE 3

Properties of the PtIr50 powders and of the components produced therefrom

| | Ex. 6 | Comp. ex. 5 |
|---|---|---|
| $d_{10}$ [µm] | 13.1 | 106.2 |
| $d_{90}$ [µm] | 66.4 | 293.4 |
| Flowability [s/50 g] | 3.4 | 6.8 |
| Flowability | Good | Moderate |
| Flowability, [s/cm³] normalized to density | 0.15 | 0.31 |
| Quality of application of powder | 0-1 | 2-4 |
| Density after additive manufacturing [g/cm³] | 21.98 | 20.8 |
| Density after additive manufacturing [%] | 99.7 | 94.3 |

The results for the Ag powders and for the Ag components produced therefrom are combined in table 4.

TABLE 4

Properties of the Ag powders and of the Ag components produced therefrom

| | Ex. 7 | Comp. ex. 6 |
|---|---|---|
| $d_{10}$ [µm] | 15.3 | 128.5 |
| $d_{90}$ [µm] | 65.7 | 307.5 |
| Flowability [s/50 g] | 3 | 6.6 |
| Flowability | Good | Moderate |
| Flowability, [s/cm³] normalized to density | 0.29 | 0.63 |
| Quality of application of powder | 0-1 | 2-4 |
| Density after additive manufacturing [g/cm³] | 10.35 | 9.5 |
| Density after additive manufacturing [%] | 98.67 | 90.56 |

The results for the Au powders and for the Au components produced therefrom are combined in table 5.

TABLE 5

Properties of the Au powders and of the Au components produced therefrom

| | Ex. 8 | Comp. Ex. 7 |
|---|---|---|
| $d_{10}$ [µm] | 27.3 | 4.9 |
| $d_{90}$ [µm] | 51.6 | 196.5 |
| Flowability [s/50 g] | 3.2 | 5.9 |
| Flowability | Good | Moderate |
| Flowability, [s/cm³] normalized to density | 0.17 | 0.31 |
| Quality of application of powder | 0-1 | 2-4 |
| Density after additive manufacturing [g/cm³] | 19.1 | 17.8 |
| Density after additive manufacturing [%] | 98.86 | 92.13 |

The results in tables 2-5 demonstrate too that only the noble-metal powders with $d_{10}$ value ≥10.0 and $d_{90}$ value ≤80.0 allow the realization of a high flowability with high quality of application of powder at the same time and the production of a component of low porosity (i.e. high relative density) via an additive manufacturing process.

The invention claimed is:

1. A powder composed of spherical noble-metal particles having a particle size distribution with a $d_{10}$ value of ≥10.0 µm and a $d_{90}$ value of ≤80.0 µm, and wherein the noble-metal particles have a mean crystallite size ≥200 nm.

2. The powder according to claim 1, wherein the noble metal is a platinum-group metal, gold or silver or an alloy composed of at least two of the aforementioned noble metals.

3. The powder according to claim 2, wherein the platinum-group metal is platinum, iridium, palladium, ruthenium, rhodium or osmium or an alloy composed of at least two of the aforementioned platinum-group metals.

4. The powder according to claim 1, wherein the noble-metal particles contain elements which are not noble metals in a proportion of not more than 0.1% by weight.

5. The powder according to claim 1, wherein the $d_{90}$ value and the $d_{10}$ value differ by at least 15 µm.

6. The powder according to-claim 1, wherein the $d_{10}$ value is within the range from 10.0 to 35.0 µm, and/or the $d_{90}$ value is within the range from 40.0 to 80.0 µm.

7. The powder according to-claim 1, wherein the noble metal is iridium, the $d_{10}$ value is within the range from 20.0 to 30.0 µm, the $d_{90}$ value is within the range from 40.0 to 80.0 µm, and the difference between the $d_{90}$ value and the $d_{10}$ value is at least 20 µm.

8. The powder according to-claim 1, wherein the powder satisfies the following condition:

$$F/\rho_{TH} \leq 0.30 \text{ s}/(50 \text{ cm}^3)$$

where F is the flowability of the powder in s/(50 g), determined in accordance with DIN EN ISO 4490: 2014-11, and $\Sigma_{TH}$ is the theoretical density in g/cm³ of the noble metal forming the noble-metal particles.

9. The powder according to claim 1, wherein, based on the number of noble-metal particles, at least 80% of the noble-metal particles satisfy the following condition:

$$0.8 \leq d_{min}/d_{max} \leq 1.0;$$

where $d_{min}$ and $d_{max}$ are the minimum diameter and the maximum diameter, respectively, of the noble-metal particle.

10. The powder according to claim 1, wherein the powder is obtained via an atomization of liquid noble metal, and optionally a classification carried out after the atomization.

11. A component comprising the powder according to claim 1, wherein the component is obtained via an additive manufacturing process and has a porosity of less than 10%.

12. An additive manufacturing process for producing a component, comprising the following steps:
 (a) applying the powder according to claim 1, in the form of a first layer to a substrate in a construction space,
 (b) at least partially melting the powder of the first layer using radiation and allowing solidification of the melted powder,
 (c) applying a further layer of the powder to the first layer,
 (d) at least partially melting the powder of the further layer using radiation and allowing solidification of the melted powder, and
 (e) repeating steps (c) and (d).

* * * * *